W. EMERY, Jr.
Corn Husker.
No. 17,731.
Patented July 7, 1857.
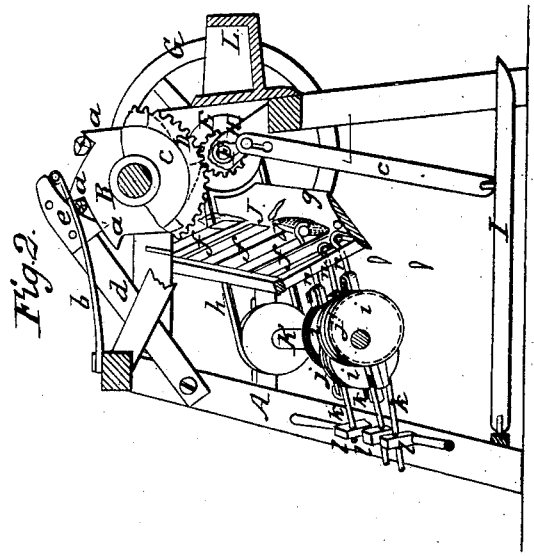
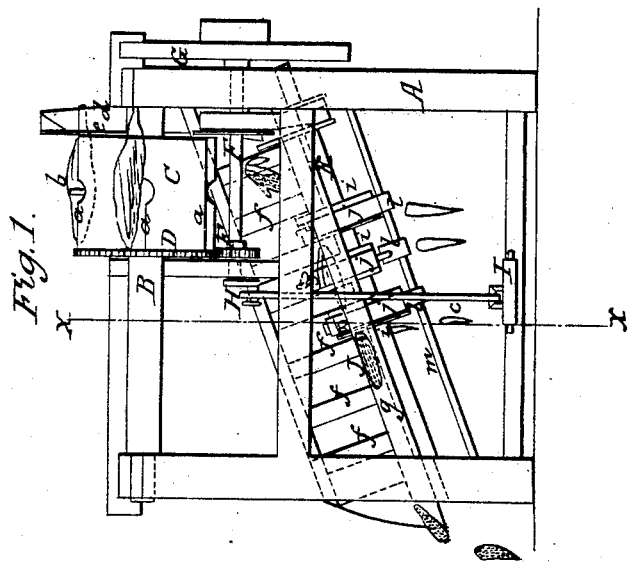

UNITED STATES PATENT OFFICE.

WILLIAM EMERY, JR., OF CHESTER, ILLINOIS.

MACHINE FOR HUSKING CORN.

Specification of Letters Patent No. 17,731, dated July 7, 1857.

*To all whom it may concern:*

Be it known that I, WILLIAM EMERY, Jr., of Chester, in the county of Randolph and State of Illinois, have invented a new and Improved Implement or Device for Husking Corn; and I do hereby declare that the following is a full, clear, and exact description of the same, reference being had to the annexed drawings, making a part of this specification, in which—

Figure 1 is a front view of my improvement. Fig. 2, is a transverse vertical section of ditto; x, x, Fig. 1, showing the plane of section.

Similar letters of reference indicate corresponding parts in the two figures.

My invention consists in a combination of parts arranged and operated as will be hereinafter fully shown and described, whereby the nubbins or butts are first cut from the ears, and the husks or integuments then stripped from them, the whole forming a simple and efficient machine.

To enable those skilled in the art to fully understand and construct my invention, I will proceed to describe it.

A, represents a framing which may be constructed in any proper manner to support the working parts. On the upper part of the framing a shaft B, is placed, a hub C, being fitted on the shaft; said hub being provided with longitudinal ledges or projections (a), placed at equal distances apart. A spring rod (b), bears against the hub C, one end of said spring rod being attached to the framing, see Fig. 2.

To one end of the hub C, a toothed wheel D is secured. This wheel D, gears into a pinion E, which is placed on the inner end of the driving shaft F. The shaft F, is placed below the shaft D, and parallel with it and has a fly G, on its outer end and a crank H, on its inner end; a treadle I, being connected with its crank by a rod (c). To the upper part of the framing A, and at one side an inclined bar (d), is attached. This bar has a knife (e), secured to its outer end; said knife bearing against the end of the hub C, the end opposite to that where the wheel D, is attached.

J, represents an inclined box or trough which is placed directly below the hub C; one side of the box or trough has slats (f); which are placed at right angles with the bottom of the opposite side (g), of the box or trough.

K, represents a shaft which is fitted in the framing A, and is inclined so as to be parallel with the box or trough J. This shaft K, is driven by a belt (h), from the driving shaft F, and has a series of eccentrics (i), placed on it. Three eccentrics are shown in the drawings, but more may be used if desired. Around each eccentric a strap (j), is placed, and to the back end of each strap a short guide rod (k), is attached. These guide rods work in blocks (l), which are fitted on an inclined bar (m), placed in the framing parallel with the shaft K. The front ends of the strap have rods (n), attached; said rods having hooks (o), at their ends. The hooks (o), work between the slats (f), and the several eccentrics are placed in different positions on the shaft K, so that the hooks will not be moved or operated in unison, or not have the same movement as regards their relative position one with the other, but be so operated that the several hooks will pass successively between the slats (f). To the front side of the framing A, a box L, is placed (see Fig. 2).

The operation is as follows: Motion is given the shaft F, by operating the treadle I, with the foot, or power may be applied by a belt direct to the shaft F. As the shaft F, rotates, motion is communicated to the hub C and the box L, being filled with ears, the operator places the ears on the ledges (a), on the hub C, the butts or nubbins of the ears are cut off by the knife (e), as the hub C, rotates and the ears fall into the inclined box or trough J, and as by their own gravity they pass down the said box or trough, the hooks (o), strip the husks from them the denuded or husked ears falling from the lower end of the box or trough. The spring rod (b), serves to keep the ears in proper position on the ledges (a), until the butts or nubbins have been cut off.

I do not claim separately any of the parts herein described, for when viewed separately and irrespective of the within described functions they perform similar or analogous devices most probably have been used; but,

Having thus described my invention, what I claim as new, and desire to secure by Letters-Patent, is:

The combination of the rotating hub C, and knife (e), inclined box or trough J, and stripping hooks (o), when the above parts are arranged to operate as shown, for the purpose set forth.

WILLIAM EMERY, Jr.

Witnesses:
J. C. HOLBROOK,
H. B. NISBET.